UNITED STATES PATENT OFFICE.

HENRY HARRIS, OF GEORGETOWN, PENNSYLVANIA, ASSIGNOR OF ONE-HALF TO HENRY W. BINGEMAN AND WILLIAM H. MOYER, OF SAME PLACE.

PROCESS OF REWORKING SCRAP-STEEL.

SPECIFICATION forming part of Letters Patent No. 531,262, dated December 18, 1894.

Application filed June 20, 1894. Serial No. 515,132. (No specimens.)

*To all whom it may concern:*

Be it known that I, HENRY HARRIS, a citizen of the United States, residing at Georgetown, county of Northumberland, State of Pennsylvania, have invented certain Improvements in the Process of Reworking Scrap-Steel, of which the following is a specification.

This invention relates to the art of reworking old or scrap steel and more particularly old steel rails and it involves the use of a composition bath adapted to uniformly heat the material while protecting it from direct contact with the products of combustion and at the same time to uniformly reduce the amount of carbon in the metal to any degree desired.

Any ordinary reverberatory furnace may be employed in the carrying out of my invention and no drawing is required to illustrate the same, inasmuch as it relates only to the bath in which the metal to be reworked is immersed while being subjected to the action of the heat from the furnace. This bath consists mainly of melted slag or some equivalent material. The slag is first placed upon the hearth of the furnace in sufficient quantity and reduced to a molten mass, the depth of which should be sufficient to amply cover the scrap rails or other metals to be placed in it. I then mix in melted slag the following chemicals in substantially the proportions stated, viz:—six pounds of lime, six pounds of cryolite, six pounds oxide of lead, two pounds of borax, and two pounds of sodium in such a manner that the said chemicals are uniformly distributed throughout the bath. I then immerse the steel bars to be reworked in this composition bath and subject them to the action of the heat of the said bath under the continued heat of the furnace a continued length of time not only to thoroughly heat the steel but also to abstract all or any desired amount of carbon and other impurities from it, the time required in any particular case being determined by the character of the steel being subjected to the process and by the condition to which it is intended to be brought for reworking.

The appearance of the heated metal and the experience of the operator with particular materials will readily determine the length of operation required.

The same bath may be reused by renewing the supply of chemicals so as to maintain approximately the same proportions given above.

What I claim is—

1. The improvement in the process of reworking old or scrap steel which consists in immersing the same in a bath of melted slag or equivalent material containing lime, cryolite, oxide of lead, borax and sodium, substantially in the proportions described and thereafter maintaining said bath at a high temperature until the immersed steel has been properly decarbonized.

2. A decarbonizing bath for old or scrap steel consisting of melted slag or equivalent material having thoroughly mixed therewith lime, cryolite, oxide of lead, borax and sodium substantially in the proportions described.

In testimony whereof I affix my signature in presence of two witnesses.

HENRY HARRIS.

Witnesses:
H. W. BINGEMAN,
ED. A. KELLY.